(12) United States Patent
Herrig et al.

(10) Patent No.: US 8,479,581 B2
(45) Date of Patent: Jul. 9, 2013

(54) DEVICE AND METHOD FOR MEASURING PRESSURE ON WIND TURBINE COMPONENTS

(75) Inventors: Andreas Herrig, Rheine (DE); Klaus Ulrich Koegler, Rheine (DE)

(73) Assignee: General Electric Company, Schenectady, NY (US)

( * ) Notice: Subject to any disclaimer, the term of this patent is extended or adjusted under 35 U.S.C. 154(b) by 21 days.

(21) Appl. No.: 13/099,644

(22) Filed: May 3, 2011

(65) Prior Publication Data

US 2012/0024071 A1 Feb. 2, 2012

(51) Int. Cl.
*G01L 9/08* (2006.01)
*F04D 29/00* (2006.01)

(52) U.S. Cl.
USPC ............................ 73/717; 416/87; 415/118

(58) Field of Classification Search
None
See application file for complete search history.

(56) References Cited

U.S. PATENT DOCUMENTS

| | | | |
|---|---|---|---|
| 4,403,186 A | 9/1983 | Kotani et al. | |
| 5,186,046 A | 2/1993 | Gouterman et al. | |
| 5,341,676 A | 8/1994 | Gouterman et al. | |
| 5,409,739 A | 4/1995 | Liu | |
| 6,253,166 B1 | 6/2001 | Whitmore et al. | |
| 6,543,298 B2 | 4/2003 | Cronin et al. | |
| 6,561,020 B2 | 5/2003 | Glenney | |
| 6,594,559 B2 | 7/2003 | Alwin et al. | |
| 6,604,029 B2 | 8/2003 | Cronin et al. | |
| 6,637,275 B2 | 10/2003 | Wu | |
| 6,668,640 B1 | 12/2003 | Alwin et al. | |
| 6,761,057 B2 | 7/2004 | Cronin et al. | |
| 7,127,950 B2 | 10/2006 | Fonov et al. | |
| 7,213,454 B2 | 5/2007 | Schauer et al. | |
| 7,257,470 B2 | 8/2007 | Hongerholt et al. | |
| 7,262,862 B2 | 8/2007 | Klaveness | |
| 7,307,702 B1 | 12/2007 | Mathur et al. | |
| 7,379,839 B2 | 5/2008 | Cronin et al. | |
| 7,428,385 B2 | 9/2008 | Lee et al. | |
| 2005/0061672 A1 | 3/2005 | Burns | |
| 2006/0103852 A1 | 5/2006 | Klaveness | |
| 2008/0277029 A1 | 11/2008 | Kula et al. | |
| 2010/0050777 A1* | 3/2010 | Zheng et al. | ............ 73/727 |

(Continued)

FOREIGN PATENT DOCUMENTS

BE 898079 A1 2/1984
CA 2049258 A1 2/1992

(Continued)

OTHER PUBLICATIONS

Prof. Dr. Ing. W. Nitsche; Dipl.-Ing. Inken Peltzer, "A320-Laminar-Fin Flight Test, Laminar Flow Measuring Glove, Suction on a Transsonic Wing", Publication on a website of the Tu Berlin, Translated by inventor: Andreas Herrig, No date available.

*Primary Examiner* — Andre Allen
(74) *Attorney, Agent, or Firm* — Global Patent Operation; Douglas D. Zhang

(57) ABSTRACT

A device for measuring fluid pressure, includes at least one flexible layer having a first surface adapted for fixing the layer to a structure, and having a second surface having at least one recess; at least one pressure sensor, provided in the at least one recess; and at least two wires connected to the at least one pressure sensor for connecting the at least one pressure sensor to a signal receiving unit. Further, a method for measuring fluid pressure is provided.

20 Claims, 8 Drawing Sheets

U.S. PATENT DOCUMENTS

| | | | |
|---|---|---|---|
| 2010/0054916 A1* | 3/2010 | Zheng et al. | 415/118 |
| 2010/0260603 A1* | 10/2010 | Dawson et al. | 416/87 |
| 2010/0266408 A1* | 10/2010 | Dawson et al. | 416/87 |
| 2012/0139244 A1* | 6/2012 | Bonnet | 290/44 |

FOREIGN PATENT DOCUMENTS

| | | |
|---|---|---|
| CH | 695709 A5 | 7/2006 |
| CN | 1203809 C | 5/2003 |
| CN | 1416780 A | 5/2003 |
| CN | 101346622 A | 1/2009 |
| CN | 101416872 A | 4/2009 |
| DE | 3942020 A1 | 7/1991 |
| DE | 4105211 A1 | 8/1992 |
| DE | 4139025 C1 | 10/1992 |
| DE | 4240782 A1 | 6/1994 |
| DE | 19603386 A1 | 8/1997 |
| DE | 19910222 A1 | 9/2000 |
| DE | 19910301 A1 | 9/2000 |
| DE | 19933631 A1 | 2/2001 |
| DE | 19939547 A1 | 2/2001 |
| DE | 19963786 A1 | 7/2001 |
| DE | 10040180 A1 | 4/2002 |
| DE | 10052053 A1 | 4/2002 |
| DE | 10056993 A1 | 5/2002 |
| DE | 10155135 A1 | 5/2003 |
| DE | 10159943 A1 | 6/2003 |
| DE | 10206219 A1 | 6/2003 |
| DE | 20023063 U1 | 7/2003 |
| DE | 20220387 U1 | 7/2003 |
| DE | 10203794 A1 | 8/2003 |
| DE | 10211198 A1 | 9/2003 |
| DE | 10311528 A1 | 12/2003 |
| DE | 10241442 A1 | 3/2004 |
| DE | 10243897 A1 | 4/2004 |
| DE | 10301948 A1 | 6/2004 |
| DE | 202004004267 U1 | 7/2004 |
| DE | 202004012573 U1 | 12/2004 |
| DE | 102004013819 A1 | 10/2005 |
| DE | 102004055220 A1 | 5/2006 |
| DE | 102005017408 A1 | 6/2006 |
| DE | 202006004829 U1 | 11/2006 |
| DE | 202006017215 U1 | 2/2007 |
| DE | 102006014106 B3 | 8/2007 |
| DE | 102006012998 A1 | 9/2007 |
| DE | 102008023163 A1 | 11/2009 |
| DE | 102008030153 A1 | 12/2009 |
| EP | 0472243 A2 | 2/1992 |
| EP | 1592345 A1 | 11/2001 |
| EP | 1910808 A1 | 4/2008 |
| EP | 1980641 A2 | 10/2008 |
| FR | 2818370 A1 | 6/2002 |
| FR | 2923600 A1 | 5/2009 |
| GB | 2295226 A | 5/1996 |
| GB | 2355801 A | 5/2001 |
| JP | 4309828 A | 11/1992 |
| JP | 2007003336 A | 1/2007 |
| KR | 102005006680 A | 1/2005 |
| KR | 100798481 A1 | 1/2008 |
| KR | 100910906 B1 | 8/2009 |
| TW | 493744 U | 7/2002 |
| TW | 522500 B | 3/2003 |
| WO | 2004/071297 A1 | 8/2004 |
| WO | 2007/012301 A1 | 2/2007 |

\* cited by examiner

DEVICE AND METHOD FOR MEASURING PRESSURE ON WIND TURBINE COMPONENTS

BACKGROUND OF THE INVENTION

The subject matter described herein relates generally to methods and systems for the pressure measurement on airfoils and hydrofoils, and more particularly, to methods and systems for the pressure measurement on wind turbine rotor blades.

At least some known wind turbines include a tower and a nacelle mounted on the tower. A rotor is rotatably mounted to the nacelle and is coupled to a generator by a shaft. A plurality of blades extend from the rotor. The blades are oriented such that wind passing over the blades turns the rotor and rotates the shaft, thereby driving the generator to generate electricity.

In order to optimize the aerodynamic properties of airfoils, hydrofoils, and particularly of wind turbine rotor blades, the pressure distribution around the profile of the same may be measured. For this purpose, a number of techniques are well known. Amongst others, it is known to drill small holes into the surface of the structure and to apply pressure tubes which are routed to a measurement system inside the structure. Further, the application of pitot tubes or pressure sensors on the surface of the profile of a foil or wing is also applied. If the pressure close to the surface of the structure shall be measured, pressure sensors are typically mounted in small holes in the surface, which allows for a measurement at face level.

However, this involves a number of disadvantages. The surface of the rotor blade or airfoil is typically manipulated by drilling holes in which the sensors are placed. Though sensors may also be mounted to the aerodynamic face of the structure, e.g. via the use of adhesives, this can lead to an undesirable distortion of the airflow in the vicinity of the attached sensor and thus to biased or misleading measurement results. Further, for acquiring the measurement data, wires have to be installed. These are typically routed through the interior of the blade or wing, involving a significant amount of labor, which is time consuming and at least partially leads to changes in the structure of the blade or wing. Sometimes, it may also be difficult or impossible to route wires through a structure because of its structural properties or accessibility. The wires may also be installed on the surface of an airfoil or rotor blade, which requires less time and effort, but may contribute to a distortion of the airflow in the vicinity of the sensors, and thus to a degradation of the quality of the acquired data.

In view of the above, it is desirable to have a technique which allows for the measurement of pressures and pressure gradients close to the surface of an airfoil or hydrofoil, and more particularly of a wind turbine component, and which avoids the above cited disadvantages.

BRIEF DESCRIPTION OF THE INVENTION

In one aspect, a device for measuring air pressure on a wind turbine component is provided. The device includes at least one flexible layer having a first surface adapted for fixing the layer to a structure, and having a second surface having at least one recess; at least one pressure sensor, provided in the at least one recess; and at least two wires connected to the at least one pressure sensor for connecting the at least one pressure sensor to a signal receiving unit.

In another aspect, a device for measuring fluid pressure is provided. The device includes at least one flexible layer having a first surface adapted for fixing the layer to a structure, and having a second surface having at least one opening; at least one pressure sensor; and at least one fluid channel connecting the at least one opening and the at least one pressure sensor.

In yet another aspect, a method of measuring fluid pressure is provided. The method includes providing at least one flexible layer having a first surface and a second surface including at least an opening, and at least one pressure sensor in fluidal connection with a fluid in the vicinity of the at least one opening; fixing the at least one flexible layer to an outer surface of a structure; and acquiring pressure signals from the at least one pressure sensor.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

The embodiments described herein include a device for measuring fluid pressures around a structure without the need for making structural modifications to the structure. More specifically, the device allows for measuring an air pressure in the vicinity of wings, wind turbine rotor blades or other parts of wind turbines such as hubs or nacelle parts.

As used herein, the term "blade" is intended to be representative of any device that provides a reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power. As used herein, "wind turbine component" is intended to be representative of any part of a wind turbine, for instance, a rotor blade, a rotor hub, a nacelle, and a tower.

Figure 1:
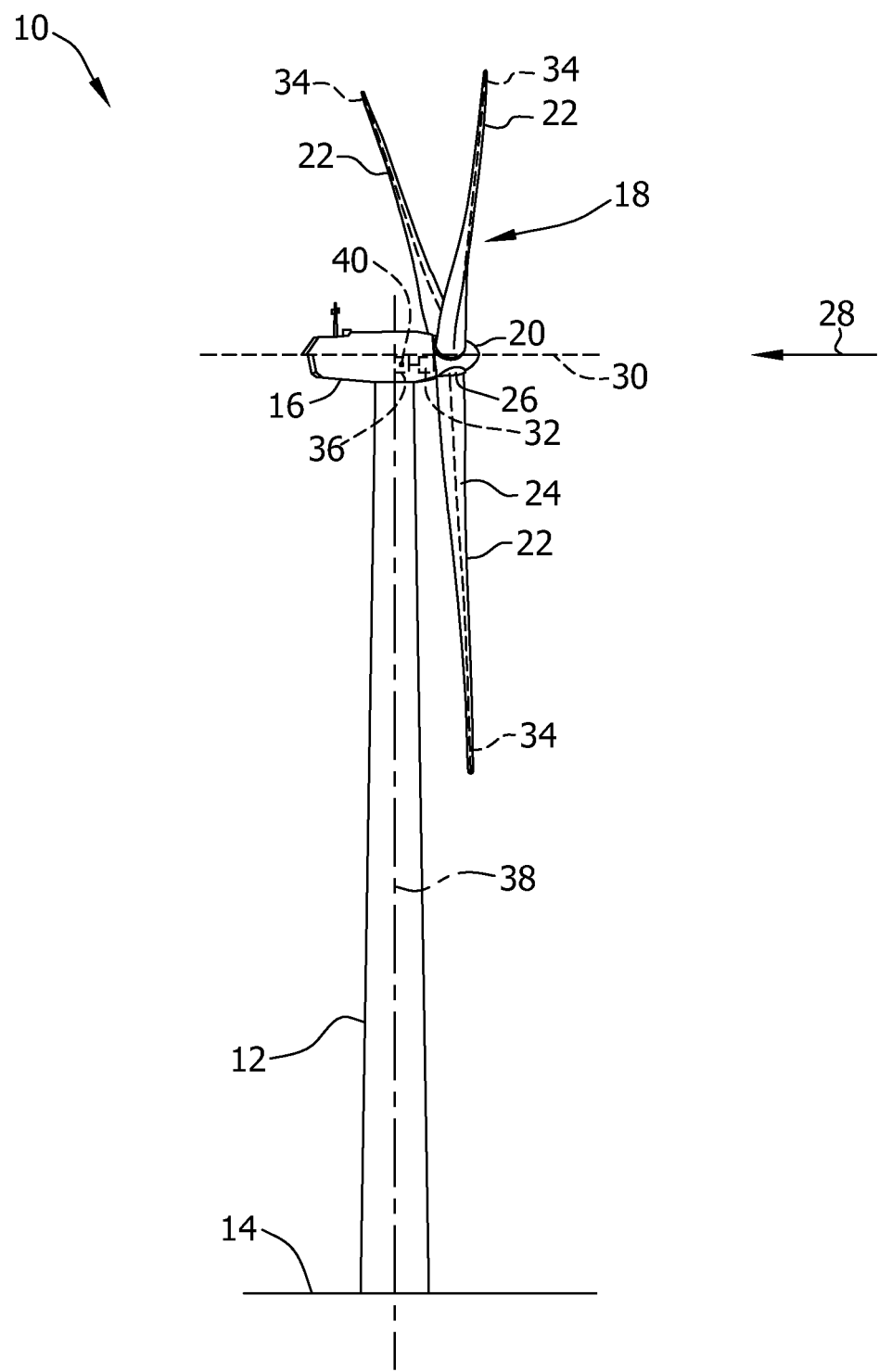
FIG. 1 is a perspective view of an exemplary wind turbine.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support system 14, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel to define a cavity (not shown in FIG. 1) between support system 14 and nacelle 16. In an alternative embodiment, tower 12 is any suitable type of tower having any suitable height.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26.

In one embodiment, rotor blades 22 have a length ranging from about 15 meters (m) to about 91 m. Alternatively, rotor blades 22 may have any suitable length that enables wind turbine 10 to function as described herein. For example, other non-limiting examples of blade lengths include 10 m or less, 20 m, 37 m, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position.

Moreover, a pitch angle or blade pitch of rotor blades 22, i.e., an angle that determines a perspective of rotor blades 22 with respect to direction 28 of the wind, may be changed by a pitch adjustment system 32 to control the load and power generated by wind turbine 10 by adjusting an angular position of at least one rotor blade 22 relative to wind vectors. Pitch axes 34 for rotor blades 22 are shown. During operation of wind turbine 10, pitch adjustment system 32 may change a blade pitch of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18.

In the exemplary embodiment, a blade pitch of each rotor blade 22 is controlled individually by a control system 36. Alternatively, the blade pitch for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28.

In the exemplary embodiment, control system 36 is shown as being centralized within nacelle 16, however, control system 36 may be a distributed system throughout wind turbine 10, on support system 14, within a wind farm, and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels include, without limitation, sensors and/or computer peripherals associated with an operator interface, such as a mouse and a keyboard. Further, in the exemplary embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a programmable logic controller (PLC) cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, wind turbine control system control commands. The execution of sequences of instructions is not limited to any specific combination of hardware circuitry and software instructions.

Figure 2:
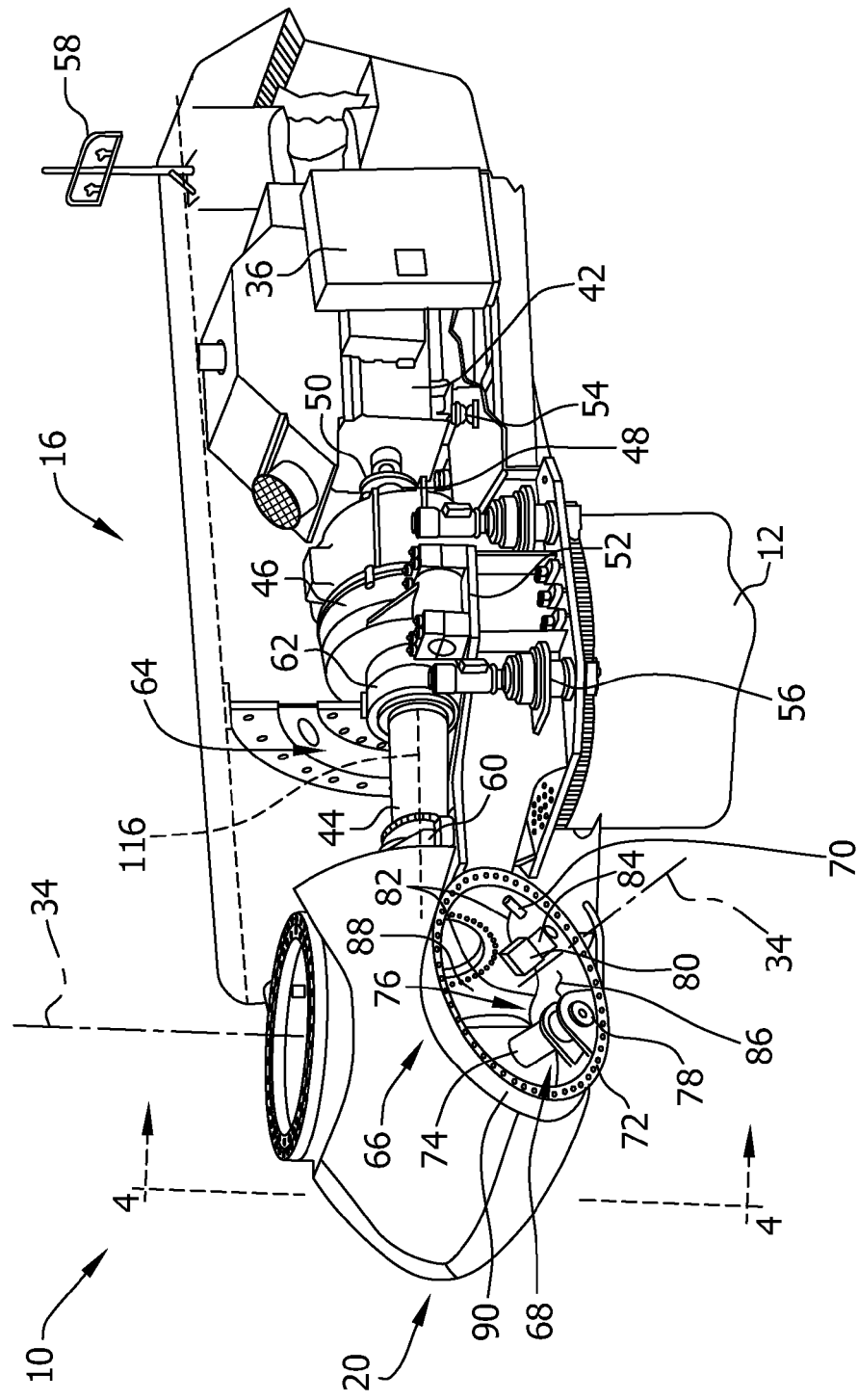
FIG. 2 is an enlarged sectional view of a portion of the wind turbine shown in FIG. 1.

FIG. 2 is an enlarged sectional view of a portion of wind turbine 10. In the exemplary embodiment, wind turbine 10 includes nacelle 16 and hub 20 that is rotatably coupled to nacelle 16. More specifically, hub 20 is rotatably coupled to an electric generator 42 positioned within nacelle 16 by rotor shaft 44 (sometimes referred to as either a main shaft or a low speed shaft), a gearbox 46, a high speed shaft 48, and a coupling 50. In the exemplary embodiment, rotor shaft 44 is disposed coaxial to longitudinal axis 116. Rotation of rotor shaft 44 rotatably drives gearbox 46 that subsequently drives high speed shaft 48. High speed shaft 48 rotatably drives generator 42 with coupling 50 and rotation of high speed shaft 48 facilitates production of electrical power by generator 42. Gearbox 46 and generator 42 are supported by a support 52 and a support 54. In the exemplary embodiment, gearbox 46 utilizes a dual path geometry to drive high speed shaft 48. Alternatively, rotor shaft 44 is coupled directly to generator 42 with coupling 50.

Nacelle 16 also includes a yaw drive mechanism 56 that may be used to rotate nacelle 16 and hub 20 on yaw axis 38 (shown in FIG. 1) to control the perspective of rotor blades 22 with respect to direction 28 of the wind. Nacelle 16 also includes at least one meteorological mast 58 that includes a wind vane and anemometer (neither shown in FIG. 2). Mast 58 provides information to control system 36 that may include wind direction and/or wind speed. In the exemplary embodiment, nacelle 16 also includes a main forward support bearing 60 and a main aft support bearing 62.

Forward support bearing 60 and aft support bearing 62 facilitate radial support and alignment of rotor shaft 44. Forward support bearing 60 is coupled to rotor shaft 44 near hub 20. Aft support bearing 62 is positioned on rotor shaft 44 near gearbox 46 and/or generator 42. Alternatively, nacelle 16 includes any number of support bearings that enable wind turbine 10 to function as disclosed herein. Rotor shaft 44, generator 42, gearbox 46, high speed shaft 48, coupling 50, and any associated fastening, support, and/or securing device including, but not limited to, support 52 and/or support 54, and forward support bearing 60 and aft support bearing 62, are sometimes referred to as a drive train 64.

In the exemplary embodiment, hub 20 includes a pitch assembly 66. Pitch assembly 66 includes one or more pitch drive systems 68 and at least one sensor 70. Each pitch drive system 68 is coupled to a respective rotor blade 22 (shown in FIG. 1) for modulating the blade pitch of associated rotor blade 22 along pitch axis 34. Only one of three pitch drive systems 68 is shown in FIG. 2.

In the exemplary embodiment, pitch assembly 66 includes at least one pitch bearing 72 coupled to hub 20 and to respective rotor blade 22 (shown in FIG. 1) for rotating respective rotor blade 22 about pitch axis 34. Pitch drive system 68 includes a pitch drive motor 74, pitch drive gearbox 76, and pitch drive pinion 78. Pitch drive motor 74 is coupled to pitch drive gearbox 76 such that pitch drive motor 74 imparts mechanical force to pitch drive gearbox 76. Pitch drive gearbox 76 is coupled to pitch drive pinion 78 such that pitch drive pinion 78 is rotated by pitch drive gearbox 76. Pitch bearing 72 is coupled to pitch drive pinion 78 such that the rotation of pitch drive pinion 78 causes rotation of pitch bearing 72. More specifically, in the exemplary embodiment, pitch drive pinion 78 is coupled to pitch bearing 72 such that rotation of pitch drive gearbox 76 rotates pitch bearing 72 and rotor blade 22 about pitch axis 34 to change the blade pitch of blade 22.

Pitch drive system 68 is coupled to control system 36 for adjusting the blade pitch of rotor blade 22 upon receipt of one or more signals from control system 36. In the exemplary embodiment, pitch drive motor 74 is any suitable motor driven by electrical power and/or a hydraulic system that enables pitch assembly 66 to function as described herein. Alternatively, pitch assembly 66 may include any suitable structure, configuration, arrangement, and/or components such as, but not limited to, hydraulic cylinders, springs, and/or servo-mechanisms. Moreover, pitch assembly 66 may be driven by any suitable means such as, but not limited to, hydraulic fluid, and/or mechanical power, such as, but not limited to, induced spring forces and/or electromagnetic forces. In certain embodiments, pitch drive motor 74 is driven by energy extracted from a rotational inertia of hub 20 and/or a stored energy source (not shown) that supplies energy to components of wind turbine 10.

Figure 3:
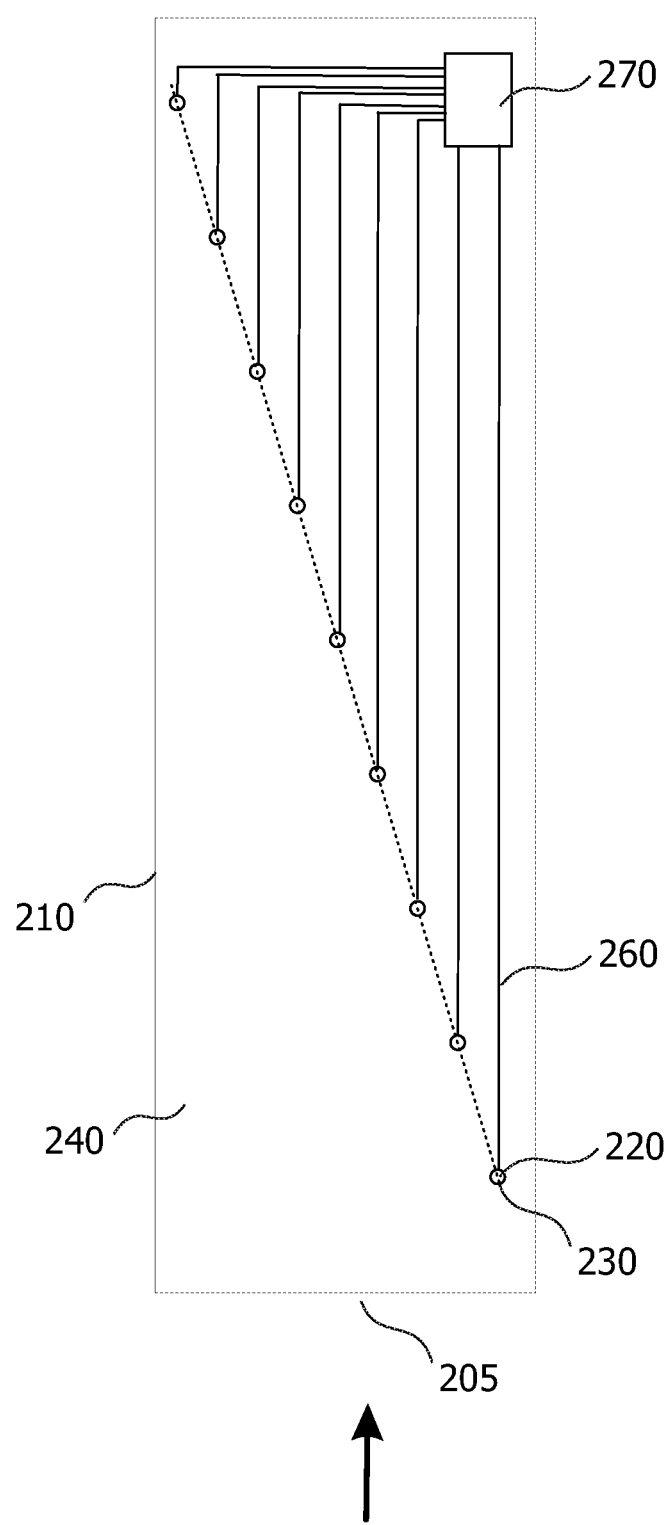
FIG. 3 is a schematic top cross sectional view on a device according to embodiments.

FIG. 3 shows a device 200 for measuring air pressure, respectively a pressure distribution around a wing or rotor blade 22 according to embodiments. The device includes a layer 210 made from or including a flexible material. The layer 210 has typically a rectangular or trapezoidal shape and a thickness significantly smaller than its width and length. The layer is provided with pressure sensors 220, which are typically placed in recesses 230 or openings in one of its surfaces, typically the outward facing surface 240. The opposite surface 250 may also have openings, which are typically covered by the structure after the application of the film.

Typically, each sensor is connected to at least two wires 260 for connecting it to a signal receiving unit 270. For illustrational purposes, the at least two wires 260 are shown as one line in FIG. 3. This unit may be mounted to the layer 210 or may be provided separately from the device 200. There are several options how the wires 270 are guided from the sensors 220 to the signal receiving unit, which are described further below.

The layer 210 includes a flexible material, such that the layer may be adapted to the outline of a wind turbine rotor blade or an airfoil etc. The layer may include polymers, such as (non-limiting) rubber, silicone, polyethylene, polyurethane, polypropylene, polyvinylchloride, epoxy or polyester resin, PEEK, polyolefin, and may also include additional or alternative materials such as fibers or metal. The material of the layer 210 is not particularly limited. The main requirements are flexibility, such that the layer may be adapted to the outline of the rotor blade, and that the material may be formed respectively modified in order to place sensors 220 in the holes/recesses 230.

The length of the layer may vary from 5% to 150%, more typically from 10% to 120% of the blade airfoil arc length, even more typically the length covers the arc length plus a few percent (from 100% to 110%). The width of the layer depends on the number of sensors in the layer. A typical number of sensors per device is 3 to 60, more typically 5 to 50. As shown in FIG. 3, the sensors are offset to each other, for instance they may be placed on a diagonal line across the layer 210 (dashed line). This offset provides that when the layer is fixed to a rotor blade or other structure, the air flow behind one sensor 220 is not influencing or disturbing the air flow (which is basically in a direction of the longitudinal axis of the layer, indicated by the arrow) of another sensor. Accordingly, the nine sensors shown in FIG. 3 may require, in a non-limiting example, a width of the layer of about half a chord length plus the distance from the outermost sensors 220 to the edge of the layer, hence for a typical chord of 1 m roughly about 50 cm. Other sensor numbers, dimensions of layer 210 or configurations may result in other outer dimensions. Expressed differently, an angle between the staggering direction (dashed line) and the air flow (arrow) typically is in the order of 3 to 30 degrees, more typically 7 to 15 degrees. The layer has a typical thickness of from 0.5 mm to 6 mm, more typically from 1 mm to 3 mm, for the application of current state of the art pressure sensors, such as piezo sensors. Depending on the type of application and pressure sensors, other thickness values may be suitable.

The signal receiving unit 270 as shown in FIG. 3 typically includes a microcontroller and/or a microprocessor and random access memory. Different from the shown embodiment, the unit 270 may also be provided outside layer 210 in other embodiments. The unit 270 includes a plurality of electrical ports for the connection of the signals from sensors 220 via wires 260. Typically, the unit 270 samples the sensor signals at the different inputs at a certain time rate. If the pressure sensors are piezo sensors, a high timely resolution of the pressure signal coming from the piezo sensor is achieved. With piezo sensors, the sample rate may typically be up to 400 kHz, more typically up to 200 kHz. In turbulent flows, such high sampling frequencies may be necessary in order to resolve the occurring pressure fluctuations. In order to achieve a suitable timely resolution with a lower sampling rate, e.g. 20 kHz, one may accept a certain loss of information and aim to recover it by computational turbulence and sensor response modeling, if required.

The unit 270 may further be provided to store the collected data over a longer period of time. Preferably, the unit 270 is equipped with a radio transmitter for transmitting the collected data to another instance, e.g., a personal computer provided in a distance from the rotor blade to which the device 200 is applied. Due to widespread use and availability, solutions based on computer WiFi networks, e.g. in the 2.4 GHz band, respectively according to the various IEEE 802.11 standards, may be used for data transmission as well.

Figure 4:
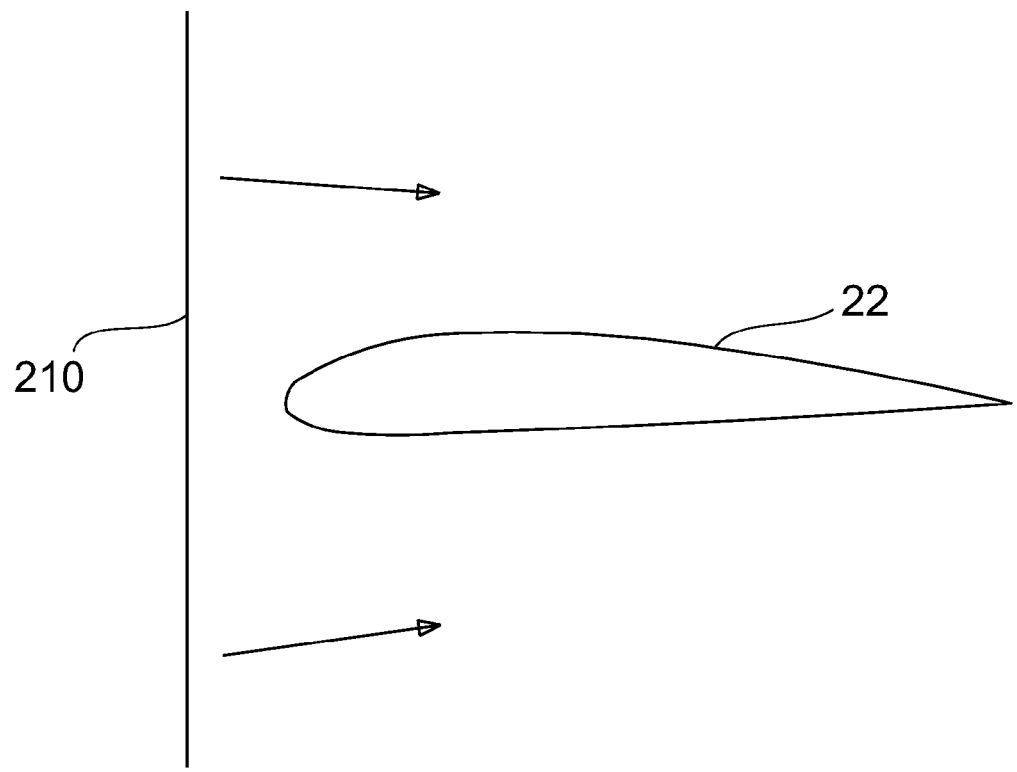
FIG. 4 is a side view of a cross section of a wind turbine rotor blade with a device according to embodiments.
Figure 4:

For measuring air pressure around a rotor blade 22, particularly in a boundary layer, the layer 210 is placed on the outer surface of rotor blade 22, such that it is wrapped around the leading edge and protrudes on both faces of the blade towards the trailing edge, such as is schematically shown in FIG. 4. The exact length of the layer 210, such as its exact placement on the rotor blade 22 depends strongly on the purpose of the measurement process, for instance which area of the blade profile shall be examined in terms of air pressure distribution. For instance, the length of the layer may be adapted such that only one side of the rotor blade 22 is covered from the leading edge to the trailing edge. In other embodiments, the layer may be adapted such that it starts at the trailing edge on one side, protrudes up to the leading edge and continues on the other side of the rotor blade to the trailing edge, such that it is possible to provide sensors substantially all around the blade profile. The layer 210 is typically fixed to a surface of the rotor blade with adhesive or sticky elements, such as an adhesive tape, a glue, or magnets.

The pressure sensor 220 is typically a piezo sensor. Piezo sensors provide a good time resolution and are thus suitable to monitor fast pressure changes in the boundary layer around rotor blade 22, which allows for the monitoring of dynamic turbulent pressure changes in the boundary layer around the profile of a rotor blade 22. As can be seen in FIG. 3, each sensor 220 is typically placed in the layer 210 such that the sensors have different distances from one end 205 of the layer 210, which allows for a monitoring of the air pressure up to the entire depth of the rotor blade profile on both sides. A typical cylindrical miniature piezo sensor has (in a non-limiting example) the following dimensions: a diameter of about 1.5 mm and a thickness of about 0.5 mm. Thus, recesses 220 in layer 210 have to be provided accordingly. They may be provided slightly smaller, e.g. from 1.2 mm to 1.4 mm diameter, such that the sensor is stably held in the flexible material of layer 210. The piezo sensors can typically also capture the average static surface pressures in order to obtain the pressure distribution around the blade.

Figure 5:
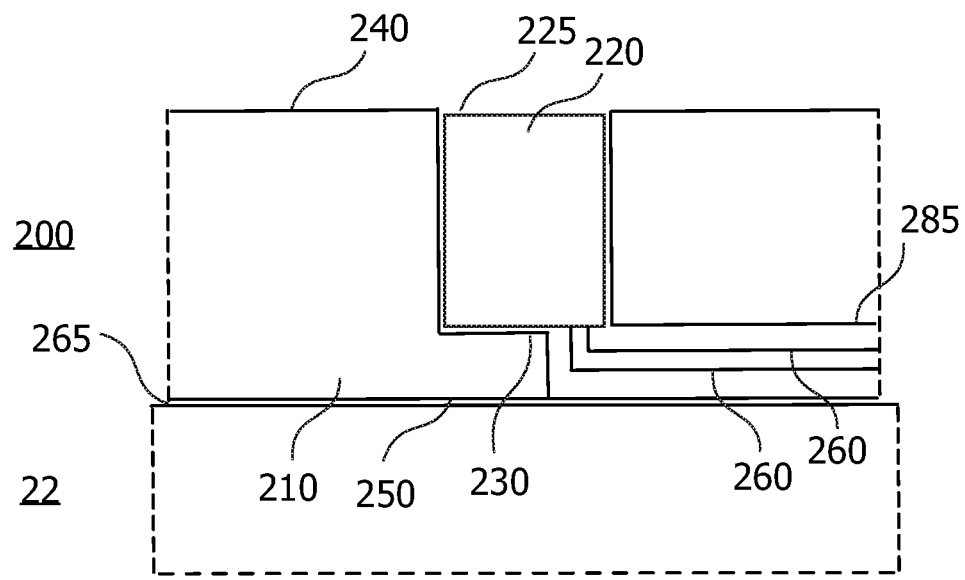
FIG. 5 is a partial cross-sectional view through a device according to embodiments.

FIG. 5 shows how a pressure sensor 220 is integrated in the flexible layer 210. The layer is typically fixed to the rotor blade 22 (only schematically shown) with its first surface 250. The surface 225 of the sensor is typically the pressure sensitive face of the sensor, such that it is in direct contact with the air or fluid around the layer 210. The two wires 260 are connected to sensor 220, they transmit the sensor signal to the signal receiving unit 270 (not shown). Channels 285 for the wires 260 may be milled in the first surface 250 of the layer 210, such that the wires are provided in these channels. Hence, the channels are on the side of layer 210 covered by the structure, e.g. the rotor blade 22, when device 200 is mounted to rotor blade 22. An adhesive tape 265 or other sticky material providing stable contact between the rotor blade 22 and device 200 is provided therebetween.

In other embodiments, other types of sensors, such as magnetodynamic sensors or condensor/electret microphones may be used, which may require a higher number of wires for operation, for instance a third and fourth wire for feeding a voltage to the sensor. The pressure sensor 220 is provided such that a surface 225 of the pressure sensor is substantially flush with the second face 240 of the layer 210. "Substantially flush" is defined herein in that the greatest distance (in a direction perpendicular to the layer) between a geometrical spot on the surface 225 of the sensor and the surface plane of the layer 210 is smaller than 0.3 mm, more typically smaller than 0.2 mm, even more typically smaller than 0.01 mm.

Figure 6:
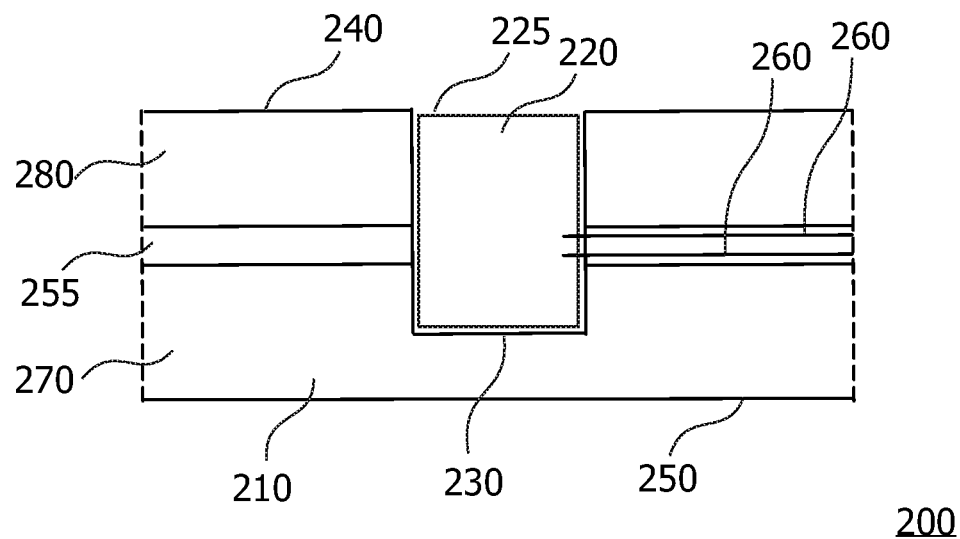
FIG. 6 is a partial cross-sectional view through a device according to embodiments.

In FIG. 6, a cross-sectional view of a further device 200 according to embodiments is shown. Therein, the layer 210 includes two sub-layers 270, 280. These layers may be connected via a layer of an adhesive or sticky material 255. The wires 260 are typically provided in the adhesive layer 255. During manufacturing of the layer 210, at first sub-layer 270 is provided. Subsequently, sensors 220 are placed into recesses 230, and the wires 260 are positioned on the sub-layer 270, for instance in an arrangement as shown in FIG. 3. Then, the layer of adhesive material 255 is provided. Wires 260 may also be placed onto the layer 255 of adhesive material after its application. The wires are manually pressed on or into the layer 255, such that they are typically at least partly surrounded by the adhesive. The layer 255 may also include materials like silicone or another polymer, which preferably provides flexibility and adhesiveness. In other embodiments, the layer 210 may include two sublayers 280 and 270, wherein one of the sublayers is provided as a flexible material like silicone, in which the wires 260 are routed, and the other sublayer is provided as a polymeric material. Suitable materials include (non-limiting) rubber, silicone, polyethylene, polyurethane, polypropylene, polyvinylchloride, epoxy or polyester resin, PEEK, and polyolefin.

Figure 7:
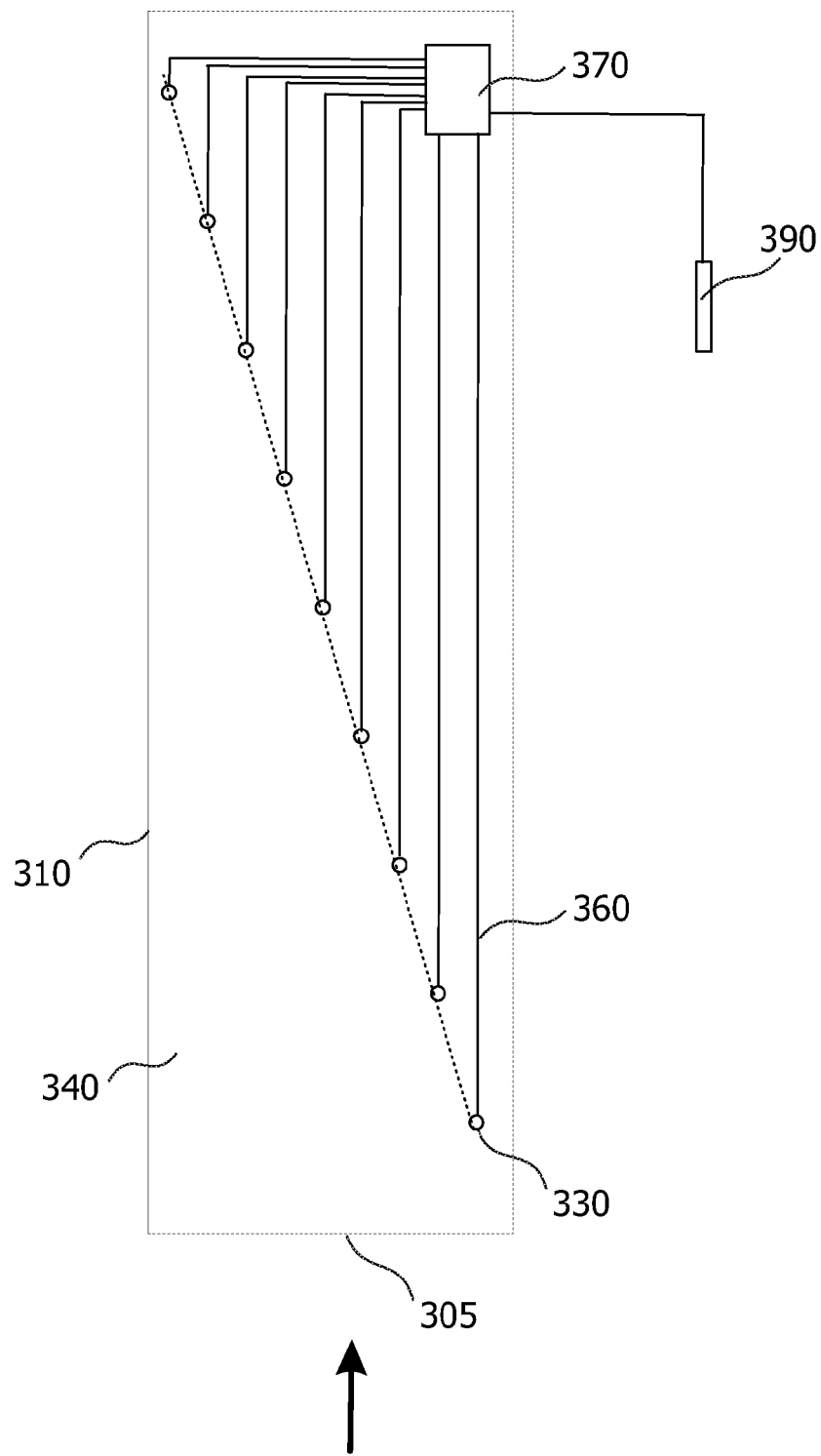
FIG. 7 is a top cross-sectional view on a device according to embodiments.

FIG. 7 shows a partial cross-sectional view of a device 300 for measuring fluid pressure according to further embodiments. This device has a layer 310 including a flexible material similar to the device of FIG. 3. In the layer, openings respectively recesses 330 are formed. These openings are typically each connected by a fluid channel 360 to a common pressure scanner respectively transducer 370, wherein a plurality of pressure sensors are typically integrated.

The fluid channel typically has a cross sectional area from 0.3 mm$^2$ to 25 mm$^2$, more typically from 0.7 mm$^2$ to 10 mm$^2$, and typically a rectangular, elliptical or round cross section.

The device 300 is used to measure static or quasi-static pressures in the vicinity of a rotor blade to which it is attached or fixed. As the openings 330 are connected via the fluid channels 360 to the pressure transducer 370, different sensors in the transducer are in fluidal connection to the air surrounding the layer 310 at opening 330. Hence, the transducer measures the static air pressure at the openings 330. Layer 310 of device 300 has basically the same dimensions as layer 210 described with respect to FIG. 3. A pitot-type or Prandtl tube 390 may be used to measure a reference pressure for comparison with the pressure data measured by the pressure sensors in the transducer 370. Via the sensors integrated in the transducer 370, the pressures are measured at a certain rate. Depending on the application, the interval between measurements may be up to several seconds, relating to a scan rate well below 1 Hz, e.g. 0.05 Hz; the scan rate may also be up to 500 Hz. Hence, the scan rate may be from 0.05 Hz to 500 Hz, more typically from 1 Hz to 40 Hz.

Figure 8:
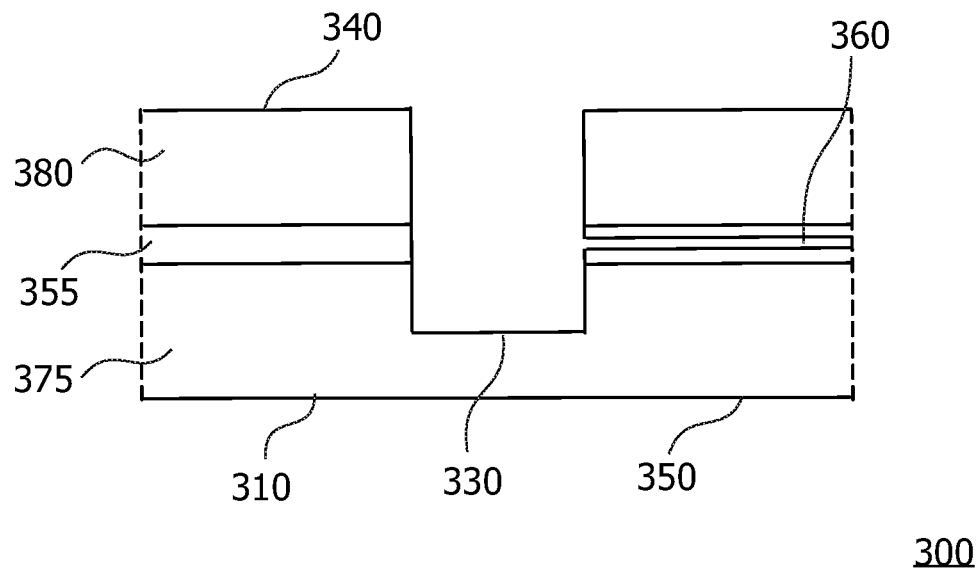
FIG. 8 is a cross-sectional view on a device according to embodiments.

FIG. 8 shows a partial cross-sectional view through layer 310 of device 300. The basic configuration is a layer 310 having two sub-layers 375, 380 as described with reference to FIG. 6. Recess 330, in fluidal connection to the air above layer 310, is connected via a fluid cannel 360 to a pressure transducer (not shown). Channel 360 may be provided as a tube embedded in the adhesive layer 355 or in the material of (sub) layer 380 itself, e.g. by casting, etc.

The fluid channels 360 may also be milled into the surface of the sub-layer 375 or the layer 380, whereby the adhesive layer 355 and/or the other sub-layer 380, respectively 375, provide for closing the milled channels.

Figure 9:
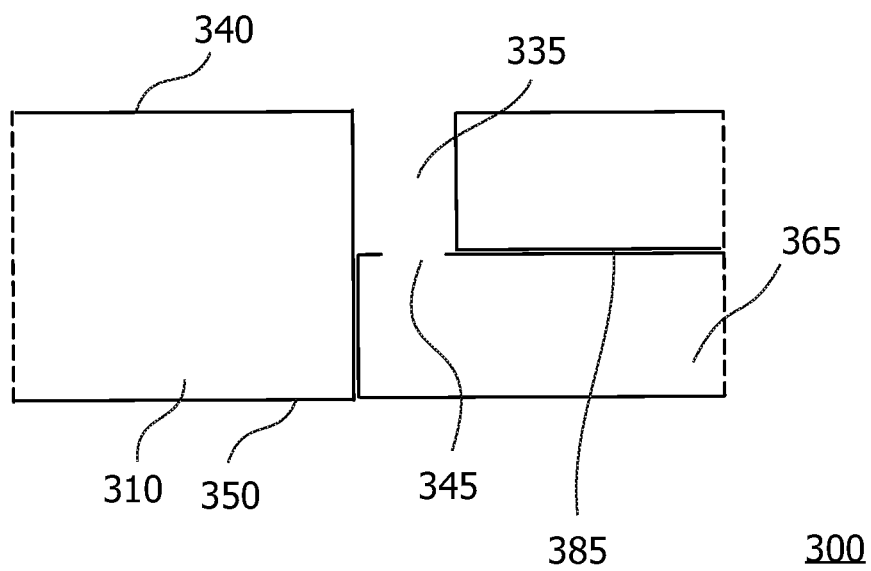
FIG. 9 is a cross-sectional view on a device according to further embodiments.

FIG. 9 shows a partial cross sectional view through a layer 310 of a device 300, in which a tube 365 is routed through a channel 385 provided in the face 350, which is in contact with the rotor blade 22 (not shown) during operation of the device 300. Via hole 335 in layer 310 and opening 345 in an end portion of tube 365, the inner volume of tube 365 is in contact with the air above face 340. Tube 365 thus serves as a connection between the air or fluid above face 340 and a pressure transducer 370 (not shown, see FIG. 7). Channel 385 may be milled or cast into face 350 of layer 310.

Tube 365 may be omitted in embodiments, which means that channel 385 then is itself the pressure conducting part between hole 335 and a sensor respectively pressure transducer (not shown in FIG. 9). Channel 385 is in this case typically closed during operation on one side by the structure itself, e.g. a surface of the wind turbine rotor blade 22, which is positioned to device 300 similarly as to device 200 in FIG. 5.

The pressure transducer may include means for storing measurement data and/or may include a radio transmitter for transmitting the measurement data, such as a WiFi transmitter.

Figure 10:
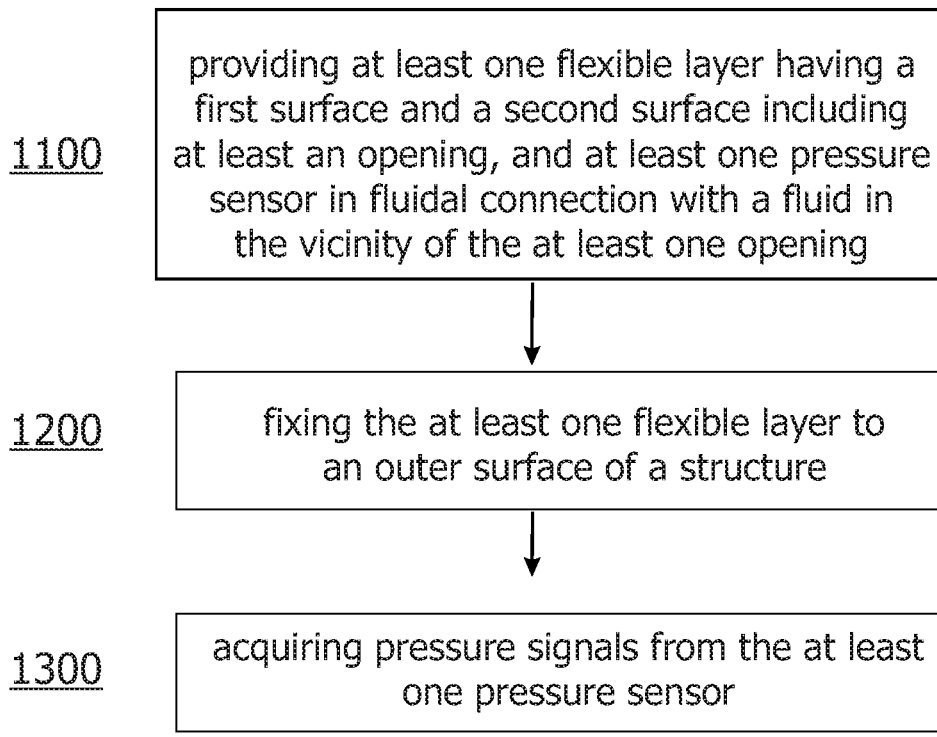
FIG. 10 shows a schematic view of a method of measuring fluid pressure according to embodiments.

FIG. 10 shows a schematic diagram of a method for measuring fluid pressure according to embodiments. The method includes providing at least one flexible layer having a first surface and a second surface including at least an opening, and at least one pressure sensor in fluidal connection with a fluid in the vicinity of the at least one opening in a block 1100. Further, fixing the at least one flexible layer to an outer surface of a structure in a block 1200; and, in a block 1300, acquiring pressure signals from the at least one pressure sensor.

The above-described systems and methods facilitate the measurement of fluid pressures around a structure without having to modify the structure itself. Further, the device may be quickly applied and also dismounted from a rotor blade, an airfoil or hydrofoil, a wind turbine rotor blade or other components of a wind turbine.

Exemplary embodiments of systems and methods for measuring fluid pressure are described above in detail. The systems and methods are not limited to the specific embodiments described herein, but rather, components of the systems and/or steps of the methods may be utilized independently and separately from other components and/or steps described herein. For example, the device and method may be used on any airfoil for hydrofoil, and are not limited to practice with only the wind turbine systems as described herein. Rather, the exemplary embodiment can be implemented and utilized in connection with many other airfoil/hydrofoil applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A device for measuring air pressure on a wind turbine component, comprising:
   at least one flexible layer having a first surface configured to fix the at least one flexible layer to a structure, and having a second surface opposite to the first surface and having at least one recess;
   at least one pressure sensor provided in the at least one recess; and
   at least two wires connected to the at least one pressure sensor for connecting the at least one pressure sensor to a signal receiving unit.

2. The device of claim 1, wherein the at least one pressure sensor is provided such that at least one surface of the at least one pressure sensor is substantially flush with the second surface of the at least one flexible layer.

3. The device of claim 1, wherein the at least one pressure sensor is a piezoelectric pressure sensor.

4. The device of claim 1, further comprising a signal receiving unit connected to the at least one pressure sensor via the at least two wires.

5. The device of claim 4, wherein the signal receiving unit comprises a radio transmitter.

6. The device of claim 1, wherein the at least two wires protrude parallel to the at least one flexible layer.

7. The device of claim 1, wherein the at least one flexible layer comprises an element selected from the list consisting of: a polymer, and a metal.

8. The device of claim 1, wherein the at least one flexible layer comprises at least two sub-layers, and wherein the at least two wires protrude between the at least two sub-layers.

9. The device of claim 1, wherein a plurality of sensors are provided in the at least one flexible layer, and wherein each sensor is connected to the signal receiving unit by at least two wires.

10. A device for measuring fluid pressure, comprising:
    at least one flexible layer having a first surface configured to fix the at least one flexible layer to a structure, and having a second surface opposite to the first surface and having at least one opening;
    at least one pressure sensor; and
    at least one fluid channel connecting the at least one opening and the at least one pressure sensor.

11. The device of claim 10, wherein the at least one flexible layer comprises at least one element selected from the list consisting of: a polymer, and a metal.

12. The device of claim 10, further comprising a plurality of fluid channels connecting a plurality of pressure sensors and a plurality of openings in the second surface of the at least one flexible layer.

13. The device of claim 12, further comprising at least one pressure transducer including the plurality of pressure sensors.

14. The device of claim 10, wherein the at least one fluid channel has a cross sectional area from 0.3 mm$^2$ to 25 mm$^2$.

15. A method of measuring, fluid pressure, comprising:
    providing at least one flexible layer having a first surface and a second surface opposite to the first surface and including at least an opening, and at least one pressure sensor in fluidal connection with a fluid in a vicinity of the at least one opening;

fixing the first surface of the at least one flexible layer to an outer surface of a structure; and acquiring pressure signals from the at least one pressure sensor.

16. The method of claim 15, wherein the fixing comprises the use of an adhesive element, and wherein the structure is an airfoil.

17. The method of claim 13, wherein the fixing comprises the use of adhesive tape, a glue, or a magnet.

18. The method of claim 13, wherein signals are acquired from a plurality of pressure sensors integrated in a pressure transducer, and wherein a plurality of fluid channels connect the pressure sensors with a plurality of openings in the second surface of the at least one flexible layer.

19. The method of claim 15, wherein a Pitot-static tube is used to measure a reference pressure.

20. The method of claim 14, wherein signals are acquired from a plurality of piezoelectric pressure sensors located at different positions in the at least one flexible layer, and wherein the sensors provide signals related to the fluid pressure at their respective positions, and wherein the sensor signals are acquired with a frequency between the rotor rotational frequency and 400 kHz.

* * * * *